United States Patent Office 2,837,192
Patented June 3, 1958

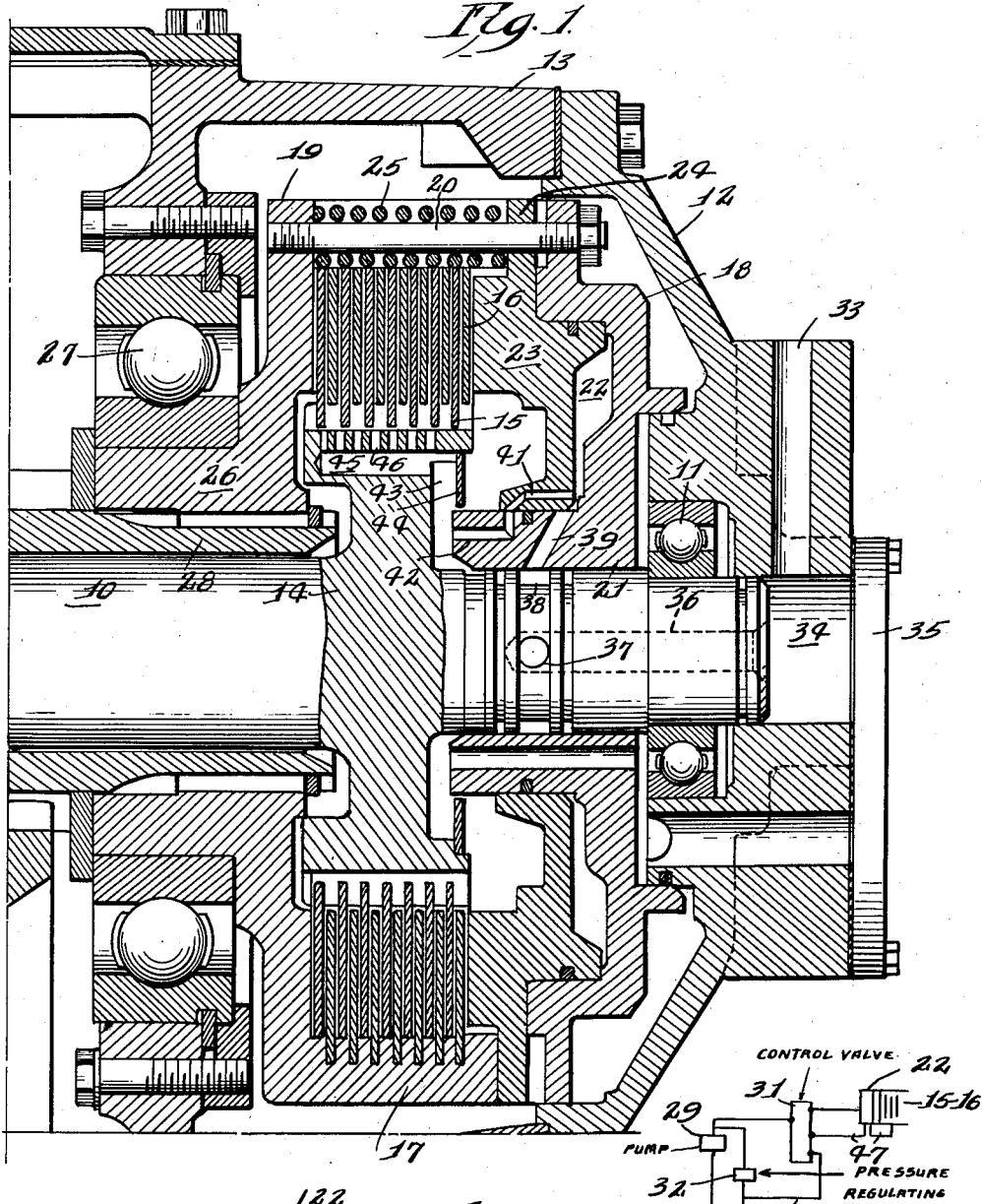

2,837,192

OIL PRESSURE ACTUATED CLUTCH

Henry J. Dunkelow, Racine, Wis., assignor to Twin Disc Clutch Company, Racine, Wis., a corporation of Wisconsin Application April 26, 1954, Serial No. 425,577

2 Claims. (Cl. 192—85)

My invention relates to hydraulically actuated, friction clutches and more particularly to an arrangement thereof in which provision is made for reducing shock when the plates are moved to engaging position.

Clutches of this general type are usually released by springs when the hydraulic pressure is cut off and when this operation is reversed, the build up of pressure in the clutch cylinder moves the clutch piston to compress the springs and engage the plates. The pressure rise is very rapid as the plates fully engage since the clearance between the plates has been taken up by the movement of the piston so the plates engage with a substantial shock which is transmitted through the connected mechanism. This action is particularly objectionable in some driver controlled vehicles, such as tractors, because of the jolt imparted to the driver. Attempts to solve this problem have usually included one or more accumulators in the hydraulic system including the clutch, but these devices embody their own disadvantages.

It is therefore one object of my invention to provide a hydraulically actuated, friction clutch employing oil as the pressure medium and in which a part of the oil is diverted to flow between the clutch plates when the clutch piston begins moving towards engaged position to thereby cool the plates and provide for a relatively soft and cushioned engagement of the plates due to the oil therebetween.

A further object is to provide a clutch of the type set forth in which the oil flow to the plates is interrupted just before full engagement.

A further object is to provide a clutch of the character indicated in which the diversion of oil to the plates is accomplished by connecting passages located in the clutch piston and cylinder, this connection being broken by movement of the piston just before the plates fully engage to thereby concentrate pump capacity on producing full engaging pressure.

These and further objects of the invention will be set forth in the following specification, reference being had to the accompanying drawing, and the novel means by which said objects are effectuated will be definitely pointed out in the claims.

In the drawing:

Fig. 1 is a sectional elevation of an oil operated clutch embodying the invention, the clutch being shown in release position.

Fig. 2 is a fragmentary, sectional elevation showing the clutch piston in engaged position.

Fig. 3 is a schematic layout showing a typical hydraulic circuit for controlling operation of the clutch.

Referring to Fig. 1, the numeral 10 designates an input shaft whose left end is appropriately journaled and connected in the usual way to a source of power, such as an engine, and whose right end is journaled in a bearing 11 carried by a cover plate 12 suitably bolted to a housing 13. At a convenient distance from the bearing 11 and inwardly of the housing 13, the shaft 10 includes an annulus 14 whose periphery is suitably toothed for relative axial sliding and driving engagement with a first plurality of annular clutch plates 15 which are alternately related to a second plurality of annular clutch plates 16 whose peripheries have driving and sliding engagement with a plurality of circumferentially spaced, cantilever arms 17. The arms 17 extend between a back plate 18 and an abutment plate 19 with which the arms are integrally formed and this subassembly is secured together by a plurality of circumferentially spaced bolts 20. The back plate 18 includes a hub 21 that encircles the input shaft 10 between the bearing 11 and the annulus 14 and is otherwise suitably shaped on the clutch plate side to form an annular cylinder 22 whose inner circumferential surface is defined by the hub 21.

An annular piston 23 is slidable in the cylinder 22 in actuating relation to the clutch plates and its periphery includes a plurality of lugs 24 which are slidable on the bolts 20 so that the piston 23 rotates with the clutch plates when engaged. A helical spring 25 encircles each bolt 20 between the abutment plate 19 and the associated lug 24 and these springs act to shift the piston 23 to the release position shown in Fig. 1 when the actuating pressure is cut off.

The abutment plate 19, against which the clutch plates are engaged, includes a hub 26 that is externally journaled in a bearing 27 carried by the housing 13 and is internally splined for connection to the adjacent end of a sleeve 28 that coaxially encircles and is spaced from the input shaft 10 and connects with the load.

Pressure is established in the cylinder 22 to engage the clutch by the following instrumentalities, reference being had to Fig. 3. An oil pump 29 of characteristic type is driven by the power source and has its intake connected to a sump 30 which may be constituted by the bottom of the housing 13, while its discharge connects with the inlet side of a control valve 31. Bridged around the pump 29 is a pressure regulating valve 32 whose outlet connects with the sump 30.

The control valve 31 connects with one end of a passage 33 in the cover plate 12 (see Fig. 1) and the other end of this passage connects with a pocket included in the cover plate between the adjacent end of the shaft 10 and a plate 35. Communicating with the pocket 34 is one end of a coaxial passage 36 in the shaft 10 which connects at the opposite end with a plurality of radial passages 37 whose delivery ends communicate with an annular channel 38 provided on the surface of the shaft and which constantly connects with one end of a passage 39 provided in the hub 21 and leading to the cylinder 22.

So far as described, the clutch construction shown in Fig. 1 is intended to merely exemplify an oil operated clutch and the invention involved and subsequently described is not limited to the particular clutch design shown. When the control valve 31 is fully opened, pressure is established in the cylinder 22 to thereby shift the piston 23 to engaging position and when this valve is closed, the pressure in the cylinder 22 exhausts through the control valve 31 and a passage 40 (see Fig. 3) to the sump 30 and the springs 25 release the plates.

The invention consists in supplying a pumped supply of oil to and between the clutch plates during release and to maintain this supply up to a certain point as the piston 23 moves to engage the plates to thereby soften the engagement and to stop this flow after engagement to preserve pump capacity. The control of this oil supply is effected by the clutch piston 23, this, by its movement.

Again referring to Fig. 1, a passage 41 is provided in the piston 23 adjacent the inner periphery thereof, the inlet end of this passage constantly communicating with the cylinder 22 while the delivery end thereof when the clutch is released registers with the inlet end of a passage 42 in the hub 21. The delivery end of the latter passage terminates at the end face of the hub 21 which is spaced from the adjacent surface of the annulus 14. Oil flowing through the passage 42 discharges into an annular pocket 43 included between the annulus 14 and an annular collecting ring 44 spaced therefrom and extending inwardly from the peripheral portion of the annulus. From the pocket 43, the oil flows into a plurality of chambers 45 provided in and circumferentially spaced around the annulus longitudinally and adjacent the periphery thereof, only one such chamber being shown in Fig. 1. Each chamber 45 is closed at the end opposite to the pocket 43 and communicates through a plurality of passages 46 with the periphery of the annulus 14 which lies close to the inner edges of the clutch plates 15 and 16. Oil flowing through the passages 46 is subjected to a centrifugal pumping action.

The internal construction of the control valve 31 is such that, in one position with the clutch released and the piston occupying the position shown in Fig. 1, some oil is delivered through the passage 39 to the cylinder 22 and thence successively through the passages 41 and 42, pocket 43, chambers 45 and passages 46 to cool and lubricate the clutch plates, the latter group of communicating means being collectively denoted by the numeral 47 in Fig. 3. Pressure in the cylinder 22 may then be of the order of 2 to 6 p. s. i. Control valves of this general type which provide for a full flow in one position and a relatively bleeding flow in another are well known in the art, so the relationship of the control valve to the actuating, cooling and soft engaging features of the clutch are only diagrammatically illustrated.

When the control valve 31 is moved to full open position, pressure in the cylinder 22 begins rising to thereby accelerate flow of oil through the passages 41 and 42 and thence to and between the clutch plates 15 and 16. The piston 23 begins moving towards the fully engaged position, but communication between the passages 41 and 42 is maintained until the opposing pressure of the release springs 25 is overcome and the clearance between the plates 15 and 16 is taken up. The piston 23 then has moved sufficiently so that the delivery end of the passage 41 has moved beyond the inlet end of the passage 42 which is masked by the piston. This arrangement insures an ample supply of oil to the clutch plates before and during engagement to substantially soften the same and also insures the full regulated capacity of the pump to maintain engagement.

I claim:

1. An oil pressure actuated clutch comprising a plurality of annular friction plates movable between released and engaged positions, a cylinder, a piston shiftable in the cylinder to engage the plates, means for supplying oil under pressure to the cylinder to actuate the piston, separate passage means in the piston and cylinder wall, respectively, which register to conduct pressure oil from the cylinder when the piston is in clutch release position, and means for collecting and delivering oil supplied by the passage means to the inner edges of the friction plates for flow between the respective opposed surfaces thereof, flow through the registering passage means being interrupted when the piston is moved to engaging position.

2. An oil pressure actuated clutch comprising a plurality of annular friction plates movable between released and engaged positions, an annular cylinder, an annular piston shiftable in the cylinder to engage the plates, means for supplying oil under pressure to the cylinder to actuate the piston, a first passage in the piston communicating at one end with the cylinder and having an opposite delivery end terminating at the inner periphery of the piston, a second passage in the cylinder wall and having an inlet registrable with the delivery end of the first passage when the piston is in clutch release position, and means for collecting and delivering oil supplied by the second passage to the inner edges of the friction plates for flow between the respective opposed surfaces thereof, flow through the first and second passages being interrupted when the piston is moved to engaging position.

References Cited in the file of this patent

UNITED STATES PATENTS

| 2,642,844 | Flinn | June 23, 1953 |

FOREIGN PATENTS

| 684,091 | Germany | Nov. 2, 1939 |
| 401,164 | Italy | June 9, 1943 |
| 654,453 | Great Britain | June 20, 1951 |